United States Patent
Hahnlen et al.

(10) Patent No.: US 11,465,390 B2
(45) Date of Patent: Oct. 11, 2022

(54) POST-PROCESS INTERFACE DEVELOPMENT FOR METAL-MATRIX COMPOSITES

(71) Applicants: Honda Motor Co., Ltd., Tokyo (JP); Ohio State Innovation Foundation, Columbus, OH (US)

(72) Inventors: Ryan M. Hahnlen, Dublin, OH (US); Marcelo J. Dapino, Columbus, OH (US); Mark Bryant Gingerich, Columbus, OH (US); Leon M. Headings, Hilliard, OH (US)

(73) Assignees: HONDA MOTOR CO., LTD., Tokyo (JP); OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 17/018,289

(22) Filed: Sep. 11, 2020

(65) Prior Publication Data
US 2021/0268769 A1    Sep. 2, 2021

Related U.S. Application Data

(60) Provisional application No. 62/984,114, filed on Mar. 2, 2020.

(51) Int. Cl.
*B32B 7/08*      (2019.01)
*B23K 11/11*    (2006.01)
(Continued)

(52) U.S. Cl.
CPC .............. *B32B 7/08* (2013.01); *B23K 11/115* (2013.01); *B23K 20/10* (2013.01); *B32B 15/01* (2013.01);
(Continued)

(58) Field of Classification Search
CPC ......... B23K 20/10; B23K 11/20; B23K 11/11; B23K 11/115; B23K 2103/166;
(Continued)

(56) References Cited

U.S. PATENT DOCUMENTS

| | | | |
|---|---|---|---|
| 2,481,614 A | 9/1949 | Thomas | |
| 3,663,356 A | 5/1972 | Li | |

(Continued)

FOREIGN PATENT DOCUMENTS

| | | |
|---|---|---|
| CN | 102107535 | 6/2011 |
| CN | 102672328 | 9/2012 |

(Continued)

OTHER PUBLICATIONS

Davies et al., "Characterizing Al Tailor-Welded Blanks for Automotive Applications", JOM, Nov. 1999, 5 pages.

(Continued)

*Primary Examiner* — Brian W Jennison
(74) *Attorney, Agent, or Firm* — Rankin, Hill & Clark LLP (57) ABSTRACT

A composite component includes a reinforcement bonded to a base component by a bond formed by, or reinforced with, a localized coupling in the base component. The bond may be formed by ultrasonic additive manufacturing. The localized coupling may include a compression of the base component, a weld in the base component, or a heat affected zone of the weld. Where the bond is formed by the localized coupling, the localized coupling encompasses the reinforcement. Where the bond is reinforced with the localized coupling, the localized coupling may encompass the reinforcement, or be arranged at an inside radius of a turn in the reinforcement. The reinforcement results in the composite (Continued)

component having enhanced properties such as lower density, increased strength, stiffness, or energy absorption capabilities.

12 Claims, 3 Drawing Sheets

(51) Int. Cl.

| | | |
|---|---|---|
| B23K 20/10 | (2006.01) | |
| B32B 15/01 | (2006.01) | |
| B32B 37/00 | (2006.01) | |
| B33Y 80/00 | (2015.01) | |
| B33Y 10/00 | (2015.01) | |
| B23K 103/16 | (2006.01) | |

(52) U.S. Cl.
CPC .... *B32B 37/0084* (2013.01); *B23K 2103/166* (2018.08); *B33Y 10/00* (2014.12); *B33Y 80/00* (2014.12)

(58) Field of Classification Search
CPC ......... B32B 15/01; B32B 15/012; B32B 7/08; B32B 15/18; B33Y 10/00; B33Y 80/00
See application file for complete search history.

(56) References Cited

U.S. PATENT DOCUMENTS

| | | |
|---|---|---|
| 4,890,784 A | 1/1990 | Bampton |
| 5,322,205 A | 6/1994 | Kato et al. |
| 5,599,467 A | 2/1997 | Okabe et al. |
| 5,942,314 A | 8/1999 | Fisher et al. |
| 6,173,886 B1 | 1/2001 | McCay et al. |
| 6,558,491 B2 | 5/2003 | Jahn et al. |
| 6,833,199 B2 | 12/2004 | Fujita et al. |
| 6,988,757 B2 | 1/2006 | McLaren et al. |
| 7,115,324 B1 | 10/2006 | Stol et al. |
| 7,829,165 B2 | 11/2010 | Grandominico et al. |
| 3,020,749 A1 | 9/2011 | Kobayashi et al. |
| 8,082,966 B2 | 12/2011 | Short |
| 8,221,899 B2 | 7/2012 | Takeda et al. |
| 8,262,968 B2 | 9/2012 | Smith et al. |
| 8,337,998 B2 | 12/2012 | Takeda et al. |
| 8,487,206 B2 | 7/2013 | Urushihara et al. |
| 8,640,320 B2 | 2/2014 | Carsley et al. |
| 8,647,453 B2 | 2/2014 | Doorbar |
| 9,101,979 B2 | 8/2015 | Hofmann et al. |
| 9,126,632 B2 | 9/2015 | Ono |
| 9,174,298 B2 | 11/2015 | Kasukawa et al. |
| 9,446,475 B2 | 9/2016 | Norfolk et al. |
| 9,564,385 B2 | 2/2017 | Schmit et al. |
| 10,843,741 B2 | 11/2020 | Nakamoto et al. |
| 10,870,166 B2 | 12/2020 | Hahnlen |
| 10,894,566 B2 | 1/2021 | Lang et al. |
| 2002/0112435 A1 | 8/2002 | Hailman |
| 2006/0165884 A1 | 7/2006 | White et al. |
| 2009/0011269 A1 | 1/2009 | Urushihara et al. |
| 2009/0117366 A1 | 5/2009 | Honma |
| 2010/0141009 A1 | 6/2010 | Kirch et al. |
| 2010/0258537 A1 | 10/2010 | Sigler et al. |
| 2012/0183802 A1 | 7/2012 | Bruck |
| 2013/0309520 A1 | 11/2013 | Lang et al. |
| 2014/0193659 A1 | 7/2014 | Lanzerath et al. |
| 2015/0050453 A1 | 2/2015 | Carson, Jr. et al. |
| 2015/0217395 A1 | 8/2015 | Spinella et al. |
| 2015/0352661 A1 | 12/2015 | Karlen et al. |
| 2016/0028216 A1 | 1/2016 | Pal |
| 2016/0045978 A1 | 2/2016 | Wang |
| 2016/0091125 A1 | 3/2016 | Lockwood et al. |
| 2016/0101599 A1 | 4/2016 | Kaiser et al. |
| 2016/0200074 A1 | 7/2016 | Lang et al. |
| 2017/0008333 A1 | 1/2017 | Mason et al. |
| 2017/0057005 A1 | 3/2017 | Wisniewski |
| 2017/0240212 A1 | 8/2017 | Hinz |
| 2017/0286821 A1 | 10/2017 | Nardi et al. |
| 2017/0287685 A1 | 10/2017 | Ferrasse et al. |
| 2018/0058327 A1 | 3/2018 | Tajiri et al. |
| 2018/0058473 A1 | 3/2018 | Kenworthy et al. |
| 2018/0222150 A1 | 8/2018 | Petrucci et al. |
| 2018/0346034 A1 | 12/2018 | Sheldon et al. |
| 2018/0361481 A1 | 12/2018 | Tenhaeff |
| 2019/0033719 A1 | 1/2019 | Cole |
| 2019/0047031 A1 | 2/2019 | Hahnlen et al. |
| 2019/0061032 A1 | 2/2019 | Wolcott |
| 2019/0061042 A1* | 2/2019 | Hahnlen ................ B62D 27/02 |
| 2020/0139480 A1 | 5/2020 | Sigler et al. |
| 2021/0173475 A1 | 6/2021 | Qian et al. |
| 2021/0197457 A1 | 7/2021 | Broach et al. |
| 2021/0276126 A1 | 9/2021 | Chen et al. |
| 2021/0309304 A1 | 10/2021 | Mueller et al. |

FOREIGN PATENT DOCUMENTS

| | | |
|---|---|---|
| CN | 103551721 | 2/2014 |
| CN | 104400204 | 3/2015 |
| CN | 105689906 | 6/2016 |
| EP | 0955121 | 11/1999 |
| EP | 2754546 | 7/2014 |
| JP | 455066 | 2/1992 |
| JP | 10291080 | 11/1998 |
| JP | 2003509244 | 3/2003 |
| JP | 2004148373 | 5/2004 |
| JP | 2004351507 | 12/2004 |
| JP | 2005199327 | 7/2005 |
| JP | 2008030100 | 2/2008 |
| JP | 2008183620 | 8/2008 |
| JP | 2008239076 | 10/2008 |
| JP | WO2012036262 | 2/2014 |
| JP | 2017080791 | 5/2017 |
| WO | WO0120534 A1 | 3/2001 |
| WO | 2015166149 | 11/2015 |
| WO | WO2016146511 | 9/2016 |

OTHER PUBLICATIONS

Patel et al., "Ultrasonic Spot Welding of Aluminum to High-Strength Low-Alloy Steel: Microstructure, Tensile and Fatigue Properties", Metallurgical and Materials Transactions A, Mar. 2014, 13 pages.

Office Action of U.S. Appl. No. 16/058,440 dated Jan. 11, 2021, 29 pages.

Office Action of U.S. Appl. No. 17/124,859 dated Sep. 1, 2021, 22 pages.

Office Action of U.S. Appl. No. 16/737,234 dated Nov. 10, 2021, 41 pages.

Notice of Allowance of U.S. Appl. No. 17/124,859 dated Nov. 16, 2021, 15 pages.

Notice of Allowance of U.S. Appl. No. 15/885,895 dated Aug. 18, 2020, 10 pages.

"Driving higher strength and lower weights" Fabrisonic, http://fabrisonic.com/metal-matrix-composites/ (Accessed Sep. 3, 2015).

Friel et al. "Ultrasonic Additive Manufacturing—a hybrid production process for novel functional products" SciVerse Science Direct, 35-40, 2013.

Graff. "Ultrasonic Additive Manufacturing", ASM Handbook: vol. 6A, Welding Fundamentals and Processes, 2011, 22 pages.

Ryabov, "Fusion Welding of Aluminum to Steel", Foreign Technology Dvision Wright-Patterson Air Force Base, Ohio, Jul. 9, 1973, 236 pages.

"Ultrasonic Additive Manufacturing presentation at ASM Symposium" https://ewi.org/ultrasonic-additive-manufacturing-presentation-at-asm-symposium/. Printed Aug. 28, 2017.

Wolcott et al. "Characterisation of Al—Ti dissimilar material joints fabricated using ultrasonic additive manufacturing" Sci & Tech of Welding & Joining, 2016, vol. 21, pp. 114-123.

Wolcott et al. "Ultrasonic additive manufacturing", Additive Manufacturing Handbook—Product Development for the Defense Industry, 2017, Chapter 17, pp. 275-313.

(56) References Cited

OTHER PUBLICATIONS

Yang "Fabrication of Long-Fiber-Reinforced Metal Matrix Composites Using Ultrasonic Consolidation" Utah State University, 2008.
Office Action of U.S. Appl. No. 16/058,440 dated May 14, 2021, 13 pages.
Office Action of U.S. Appl. No. 16/058,440 dated Oct. 6, 2021, 16 pages.
Notice of Allowance of U.S. Appl. No. 16/737,234 dated Feb. 7, 2022, 13 pages.
Notice of Allowance of U.S. Appl. No. 16/058,440 dated Feb. 16, 2022, 22 pages.

* cited by examiner

POST-PROCESS INTERFACE DEVELOPMENT FOR METAL-MATRIX COMPOSITES

BACKGROUND

Metal parts for manufacturing are often produced from a substantially flat blank material (e.g. sheet metal) by subjecting the blank to a forming process (e.g. stamping, extruding, etc.) so that the blank is formed into a formed component with a desired contoured shape. In an effort to reduce the weight of these formed components, the gauge (i.e. thickness) of material used in these formed components is reduced. However, in reducing the gauge of the material used in the formed component, the strength and other characteristics of the formed component are reduced or otherwise compromised. In order to address the reduction in strength associated with the reduction in gauge, several methods are used to reinforce the formed components.

Conventional reinforced formed components include adhesive patches (both non-reinforced and reinforced) placed on the component after it is formed; secondary reinforcing structures of dissimilar composition fastened or welded to the blank or to the formed component; or similar materials welded to the blank prior to forming. Examples of reinforcing strategies include adhesive patches used in metal vehicle door outer panels, spot-welded stiffeners in vehicle frame components, tailor welded and tailor rolled blanks in automobile door inner structures, and patches of reinforcing steel that are spot welded to steel blanks prior to forming. Bolt attachment points for high stress components, like door hinges, are often reinforced using thicker sheet material in tailor welded blanks or reinforcement metal plates attached after forming. Other methods for generating formed vehicle components with spatially variable properties include variable quench hot stamping and selective post-forming heat treatments.

To date, a key method of reducing the weight of vehicles has been the use of "down-gauging" sheet metal components or changing to a "lightweight" material such as aluminum from steel. With respect to formed metal components, reducing the gauge of a sheet metal blank has an inherent limitation based upon strength, stiffness, energy absorption, or fatigue properties required for the formed metal component. Although lightweight materials may be less dense than steel, they often have lower strength and are less stiff.

In a similar manner, extruded metal components have a uniform wall thickness, and therefore a uniform strength and stiffness, along the extrusion direction, such that the wall thickness is based on the requirements of the most highly loaded region of the component.

BRIEF DESCRIPTION

According to one aspect, a composite component includes a base component, a reinforcement, and a localized coupling reinforcing, or forming, a bond between the base component and the reinforcement. The localized coupling is arranged only at a discrete location on the base component, and includes a compression of the base component, a fusion weld in the base component, or a heat affected zone of the weld.

In another aspect, a method of making a composite component includes providing a base component and a reinforcement. A localized coupling is formed in the base component to reinforce, or form, a bond between the base component and the reinforcement. The localized coupling is arranged only at a discrete location on the base component. The localized coupling includes a compression of the base component, a fusion weld in the base component, or a heat affected zone of the weld.

DETAILED DESCRIPTION

A composite component is provided that has spatially varying material properties. Because of this, the composite component can have reduced mass, yet meet overall requirements with respect to strength, stiffness, and energy absorption. The composite component addresses barriers present in current manufacturing processes relating to forming, fixity (location stability during the manufacturing process), joining, and thermal expansion. In this regard, spatial variation of various material properties within the formed component is only coarsely possible with conventional manufacturing technology.

The present subject matter provides a composite component 2 including a base component 4 and a reinforcement 6 bonded to the base component by a mechanical/friction or metallurgical bond 8. As shown, the composite component 2 includes only one reinforcement 6. However, it should be understood that the composite component 2 can include more than one reinforcement 6, which can be arranged in various orientations with respect to each other, and may be included at predetermined locations on the base component 4 to provide a desired enhancement in a particular characteristic of the base component or composite component 2. The composite component 2 includes a localized coupling 10 arranged only at a discrete location on the base component 4. The localized coupling 10 reinforces the already formed bond 8 between the base component 4 and the reinforcement 6, or forms the bond 8 between the base component 4 and the reinforcement 6.

FIGS. 5-9 depict the localized coupling 10 being used to form the bond 8 at discrete locations along the reinforcement 6, which anchors the reinforcement 6 to the base component 4.

FIGS. 1-4 depict the localized coupling 10 being used to reinforce an already formed bond 8. In FIGS. 1-4, the reinforcement 6 may have a strength that exceeds the already formed bond 8, which has not yet been reinforced with the localized coupling 10, thus possibly resulting in an inadequate structural performance for the composite component 2. To address this concern, the already formed bond 8 may be reinforced at discrete locations along the reinforcement 6 with the localized coupling 10. As used herein, "reinforce" or cognate terms means that the localized coupling 10 strengthens the bond 8 itself (FIGS. 1-3, i.e. "direct reinforcement" of the bond 8), or that the localized coupling 10 provides support to the bond 8 without strengthening the bond 8 itself (FIG. 4, i.e. "indirect reinforcement" of the bond 8).

The localized coupling 10 may be formed in the base component 4 to encompass a portion of the reinforcement 6, and may include a compression 22, a weld 20 (e.g. a resistance spot weld, RSW) with or without a heat affected zone 24, or only the heat affected zone (HAZ) 24 apart from the weld 20.

Where the localized coupling 10 is used to directly or indirectly reinforce the already formed bond 8 (e.g. in FIGS. 1-4), the localized coupling 10 may be formed by post-processing steps, i.e. processing steps performed after the bond 8 is formed between the reinforcement 6 and the base component 4. The localized coupling 10 is included to reinforce the bond 8, at least at discrete locations along the reinforcement 6, thus increasing the structural performance of the composite component 2 as compared to a situation where no localized coupling 10 is included. The localized coupling 10 may directly reinforce the already formed bond 8 by strengthening the bond 8 itself. This may be accomplished by the localized coupling 10 encompassing a portion of the bond 8 and thereby anchoring the reinforcement 6 to the base component 4 at discrete locations, and/or by promoting grain growth and diffusion across, as well as relieving stress in, the already formed bond 8 at discrete locations.

The localized coupling 10 may directly reinforce the already formed bond 8 by increasing the interface strength of a portion of the bond 8 encompassed by the localized coupling 10 by encouraging grain growth and diffusion across the various interfaces of the composite component 2. The localized coupling 10 may increase ductility or strain to failure in the composite component 2. The local increase in interface strength may increase the structural integrity of the composite component 2. The number of sites at which the localized coupling 10 is to be formed, may be determined by the tensile or compressive strength of the reinforcement 6.

The post-processing steps to form the localized coupling 10 may be performed after a forming operation that is used to form contours in the base component 4/composite component 2 into a desired configuration. In a non-limiting example, the forming operation may include cold stamping, rolling, die forming, forging, etc.

The benefit of forming the localized coupling 10 after a forming operation may be to provide a lower initial interface strength between the base component 4 and the reinforcement 6 during the forming operation, thus allowing for easier relative movement between reinforcement 6 and the base component 4 during the forming operation. Forming the localized coupling 10 after a forming operation provides a higher final interface strength that provides a stronger composite component having the desired shape. This reinforcement 6 helps the composite component 2 to have a desired performance characteristic in its final shape. If the localized coupling 10 were formed first, follow by the forming operation, then the reinforcement 6 may undesirably fracture during the forming operation, and thus offer less reinforcement to the final composite component 2.

The base component 4 may comprise a first metal material. The first metal material is not particularly limited, and may comprise aluminum or an aluminum-based alloy. Other metals and metal alloys may be used as, or included in, the first metal material.

The reinforcement 6 includes material that is similar or dissimilar in composition to that of the base component 4. That is, the composition of the reinforcement 6 is either the same or different than the composition of the base component 4. The reinforcement 6 may include a second metal material having a composition the same as, or different from the first metal material; and may be a single continuous fiber.

If the reinforcement 6 is made from a material that is different from the base component 4, the material of the reinforcement 6 may be at least one of stronger, stiffer, have greater energy absorption, and have increased fatigue life than the material of the base component 4.

The material of the reinforcement 6 is not particularly limited and may comprise steel or a steel-based alloy or a steel-based composite, a stack of one or more metal layers that are UAM welded to each other, a discontinuously reinforced metal matrix composite (DRx), a continuous fiber, tows, threads, wire, cables, meshes, fabrics, and/or veils, the composition of which is not particularly limited and may be chosen to modify a particular performance characteristic of the final composite component 2 as desired. As used herein, a "continuous fiber" is a single elongated continuous piece of a given material or combinations of material which may have a circular, flat (such as a ribbon), or other cross-sectional shape; a tow is an untwisted bundle of fibers; a thread is a twisted bundle of fibers; meshes and fabrics can include fibers, tows, and threads; veils are non-woven mats or substantially randomly placed fibers; a wire is a continuous metal fiber; and a cable is a twisted bundle of metal fibers. The reinforcement may include for example, structural metals such as steel, titanium, magnesium, or aluminum, as well as ceramic such as silicon carbide or alumina, and organic polymers such as carbon fiber, poly(p-phenylene-2,6-benzobisoxazole) (PBO) such as Zylon®, ultra-high molecular weight polyethylene (UHMWPE) such as Dyneema®, etc., to increase strength and stiffness.

The reinforcement 6 may be mechanically, chemically, thermally, or metallurgically bonded to the base component 4 in such a way that, after forming, the reinforcement 6 is located in key areas/regions of the composite component 2 for enhanced properties such as lower density, increased strength, increased stiffness, control of thermal deformation, or increased energy absorption capabilities as compared to the base component 4 without the reinforcement 6.

The reinforcement 6 is attached discretely to the base component 4 prior to forming operations that bend and otherwise deform the base component 4 to include contours. The reinforcement 6 thus reinforces the base component 4. As used herein, "reinforce" and cognate terms means to increase one or more metrics of strength, stiffness, energy absorption, and fatigue life for the formed composite component 2 as compared to a similar base component not including the reinforcement 6. The process of reinforcing the base component 4 with the reinforcement 6 allows thinner gauge material to be used as the base component 4, which results in a corresponding reduction in weight, yet the formed composite component 2 still maintains the required performance characteristics as if made from a uniformly thicker sheet metal material. The current methods are beneficial because thinner gauge base components 4 and lower strength materials are easier to form than thicker gauge base components, giving the possibility of reduced manufacturing costs.

The present subject matter enables lightweight construction, higher performance (e.g. strength, stiffness, energy absorption, and fatigue life) than homogenous sheet material, tailored spatially variable properties, more robust attachment of reinforcements to the base component, reduced part count, and reduced manufacturing costs by eliminating ultra-high strength blanks, hot formed blanks, and tailor welded/tailor rolled blanks.

Figure 1:
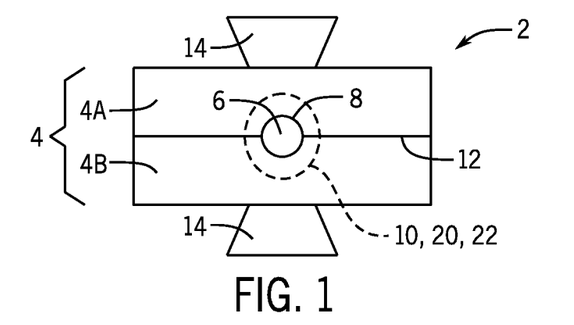
FIG. 1 is a schematic cross-sectional view of a composite component in accordance with the present subject matter.
Figure 2:
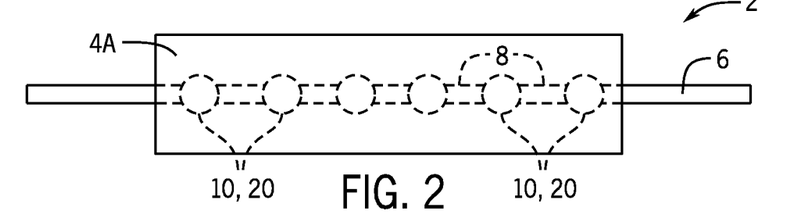
FIG. 2 is a schematic top view of the composite component of FIG. 1.

FIGS. 1 and 2 depict a composite component 2 including a base component 4 and a reinforcement 6. The base component 4 includes the first metal material. The reinforcement 6 may include the second metal material or may include a single continuous fiber.

The base component 4 may include a first layer 4A and a second layer 4B as shown in FIG. 1. However, this is not required, and the base component 4 may include more or less layers, such as being a single layer having the reinforcement 6 attached thereto. The first layer 4A and second layer 4B may each include a metal material. The metal material of the first layer 4A may have a composition that is the same as, or different than, the metal material of the second layer 4B. Although depicted as having the same size (i.e. width, length, and height), it should be understood that the first and second layers 4B may have different sizes in one or more of width, length, and height.

The reinforcement 6 may be arranged at an interface 12 between the first layer 4A and second layer 4B, and the first layer 4A may then be ultrasonically welded to the second layer 4B at the interface 12 in an Ultrasonic Additive Manufacturing (UAM) process to thereby form a UAM weld (i.e. ultrasonic weld) at the interface 12. The first and second layers 4A, 4B may also be roll bonded together with the reinforcement 6 being arranged at the interface 12.

This bond 8 between the reinforcement 6 and the first and second layers 4A, 4B may be formed by the UAM process (FIGS. 1-4). Ultrasonically welding the reinforcement 6 to the first and second layers 4A, 4B to form the bond 8 may result in the reinforcement 6 being embedded in both of the first and second layers 4A, 4B as shown. Where the reinforcement 6 includes metal, the bond 8 may be a UAM formed metallurgical bond. Where the reinforcement 6 does not include metal, the bond 8 may be a UAM formed mechanical/friction bond.

The UAM weld at the interface 12 may be formed to encompass the entire interface 12, and thus encompass the entire reinforcement 6 and form the bond 8 between the entire reinforcement 6 and the base component 4. Alternatively, the UAM weld at the interface 12 may only encompass portions of the interface 12 and only portions of the reinforcement 6, and thus form the bond 8 between only portions of the reinforcement 6 and the base component 4. One or more ultrasonic welds may be formed at the interface 12 and these may intersect the reinforcement 6.

UAM is a solid-state (i.e. no melting) continuous, additive metal welding process which provides an ultrasonic weld, and thus a fully dense, gapless three dimensional part. In the UAM process, an ultrasonic welder may be used, which includes a sonotrode (i.e. horn) driven by one or more piezoelectric transducers to impart ultrasonic vibrations under a compressive force to the parts to be joined. The sonotrode operates at a vibration frequency of about 20 kHz (nominal) that is transverse to the rolling direction to create plastic deformation between a metal material and the object to which it is being welded. When two metal parts are being ultrasonically welded, vibrations imparted by the sonotrode on the workpiece along with a static compressive force cause a metallurgical bond to form between the two metal parts. Process temperatures are low, typically below 150° C., and thus inhibit the formation of brittle intermetallics, inhibit altering the microstructure of the metals, and inhibit heat-induced distortion or property degradation of the metals.

UAM is useful for joining the first and second layers 4A, 4B and for joining the reinforcement 6 to the base component 4, because UAM is a low temperature process, meaning that it may not alter the effect of prior heat treatments or the microstructure of the metal material on a meso- or macro-scale, and is able to join dissimilar metal materials without formation of adverse intermetallic compounds. Second, UAM produces a continuous hermetic bond at the interface 12, meaning the reinforcement 6 can be isolated from the exterior environment thereby avoiding corrosion or infiltration by contaminants such as an electrolyte.

UAM can be used to join dissimilar materials (i.e. different metals such as between the first and second layers 4A, 4B or between the base component 4 and a metal reinforcement 6) and allows for embedding the reinforcement 6 (e.g. single continuous fiber) within the metal material of the base component 4.

This UAM process produces the bond 8 between the reinforcement 6 and the base component 4. Forming the bond 8 may include embedding the reinforcement 6 in the base component 4. If the reinforcement 6 is a single continuous fiber that does not include metal materials, then the metal material of the base component 4 may flow into voids in the continuous fiber or around the continuous fiber, thus producing a mechanical/friction bond 8 between the reinforcement 6 and the base component 4. If on the other hand, the reinforcement 6 is itself a metal material, then an ultrasonic weld may form between the metal materials of the reinforcement 6 and that of the base component 4, thus producing a metallurgical bond 8 between the reinforcement 6 and the base component 4. As such, the bond 8 can include one or both of a mechanical/friction bond, and a metallurgical bond.

Instead of being pressed into the first and second layers 4A, 4B during UAM, the reinforcement 6 may be arranged in a preformed channel in one or both of the first and second layers 4A, 4B at the interface 12.

Figure 3:
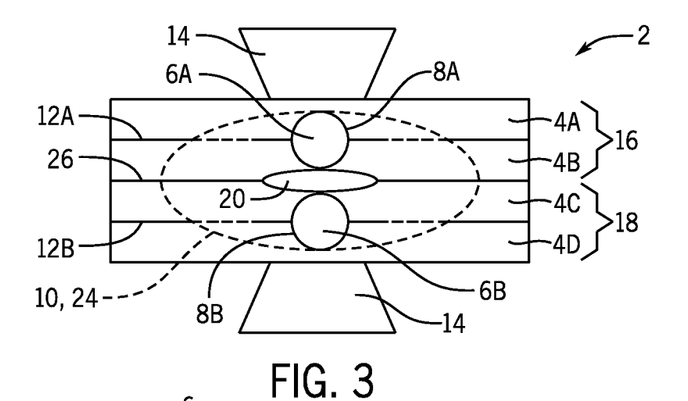
FIG. 3 is a schematic cross-sectional view of a composite component in accordance with the present subject matter.

The localized coupling 10 may be formed in a post-processing step after the bond 8 is formed (FIGS. 1-4). The localized coupling 10 may include a resistance spot weld (RSW) 20 formed in the base component 4 (i.e. in the first and second layers 4A, 4B), and which encompasses a portion of the reinforcement 6 only at discrete locations of the reinforcement 6 (FIGS. 1-3). That is, the resistance spot weld 20 does not encompass the entire reinforcement 6, but encompasses only discrete portions of the reinforcement 6, and thereby anchors the reinforcement 6 to the base component 4 at these discrete locations. The resistance spot weld 20 may be formed by operating two RSW tips 14 while having the composite component 2 (including a portion of the reinforcement 6) arranged between them. Such post-processing to form a RSW 20 could be performed in a short time, on the order of 0.5 second for each RSW 20. The localized coupling 10 in the form of the RSW 20 may increase interface strength and encourage grain growth and diffusion at the interface 12 between the first and second layers 4A, 4B and at the interface between the reinforcement 6 and the base component 4, as well as relieve stress from the UAM weld at the interface 12 and/or from other previous processes. The RSW 20 may also be the only bond formed between the first and second layers 4A, 4B.

As depicted in FIG. 1, a portion of the reinforcement 6 is arranged directly in line between the two RSW tips 14. In this position, an individual RSW 20 may encompass only a portion of the reinforcement 6 and only a portion of the already formed bond 8 between the reinforcement 6 and the base component 4. A similar configuration is shown in FIG. 2, where several RSWs 20 are discrete from one another, and contact the reinforcement 6 only at discrete points along a length of the reinforcement 6 to provide the localized couplings 10. At other locations along the length of the reinforcement 6, only the bond 8 without the localized coupling 10 exists between the reinforcement 6 and the base component 4. The RSW tips 14 create the discrete RSWs 20 by the application of welding energy, but may also be pressed against the base component 4 with an amount of pressure to thereby compress the base component 4 and reinforcement 6 to also create a compression 22 as the localized coupling 10 of the bond 8.

In another embodiment, the composite component 2 may not include a reinforcement 6 as depicted in FIGS. 1-2 in the form of a single continuous fiber, but may instead include the first layer 4A acting as the base component, which is UAM welded at the interface 12 to the second layer 4B acting as the reinforcement 6. This may be similar to the composite component 2 depicted in FIG. 4, but without the reinforcement 6 in the form of a single continuous fiber. In this embodiment, the UAM weld at the interface 12 is the bond between the first layer 4A (i.e. base component) and the second layer 4B (i.e. reinforcement). If the first layer 4A and the second layer 4B are metals, then the bond 8 may be a metallurgical bond. The composite component 2 may include a localized coupling 10 formed at discrete locations in the UAM weld at the interface 12, so as to strengthen the bond 8 between the first and second layers 4A, 4B. The localized coupling 10 may include a RSW 20 and/or associated HAZ 24, and/or a compression 22 of the first and second layers 4A, 4B. The RSW 20, as the localized coupling 10, may thereby directly reinforce the bond 8 by anchoring the first layer 4A to the second layer 4B.

FIG. 3 depicts a composite component 2 that includes a first piece 16 and a second piece 18 that are welded together by a RSW 20, and optionally also by a UAM weld at an interface 26 between them. The first piece 16 and the second piece 18 may be similar to the composite component 2 as described in FIGS. 1-2, and the similar components here will be understood to have similar features as described with respect to FIGS. 1-2.

The first piece 16 includes a first layer 4A and a second layer 4B bonded by a UAM process at a first interface 12A, which UAM process embeds a first reinforcement 6A into the first and second layers 4A, 4B and forms a first bond 8A between the first reinforcement 6A and the first and second layers 4A, 4B. The second piece 18 includes a third layer 4C and a fourth layer 4D bonded by a UAM process at a second interface 12B, which UAM process embeds a second reinforcement 6B into the third and fourth layers 4C, 4D and forms a second bond 8B between the second reinforcement 6B and the third and fourth layers 4C, 4D. The first piece 16 and second piece 18 of FIG. 3, and composite component 2 of FIG. 1, are not limited to having only two layers, and may include more or less than two layers. If the first and second reinforcements 6A, 6B are metal, then the first and second bonds 8A, 8B may be metallurgical bonds. If the first and second reinforcements 6A, 6B are not metal, then the first and second bonds 8A, 8B may be mechanical/friction bonds.

The RSW 20 is formed between the first piece 16 and the second piece 18 by RSW tips 14. However, the RSW 20 may or may not encompass the bonds 8A, 8B or the reinforcements 6A, 6B in either of the first or second pieces 16, 18. Instead, the heat affected zone (HAZ) 24 produced when forming the RSW 20 may encompass a portion of at least one of the first or second pieces 16, 18, a portion of at least one of the bonds 8A, 8B, and/or a portion of at least one of the reinforcements 6A, 6B. As shown, the HAZ 24 encompasses a portion of both the first and second pieces 16, 18, a portion of both of the bonds 8A, 8B, and a portion of both of the reinforcements 6A, 6B. The HAZ acts as the localized coupling 10 to enhance the bonds 8A, 8B by increasing their strength. This may be accomplished by the HAZ 24 encouraging grain growth and diffusion at the bonds 8A, 8B between the reinforcements 6A, 6B and the respective layers 4A-4D in each of the first and second pieces 16, 18, so as to increase the mechanical coupling (where the reinforcements 6A, 6B are not metal) or the metallurgical coupling (where the reinforcements 6A, 6B are metal) between the first reinforcement 6A and the first and second layers 4A, 4B and between the second reinforcement 6B and the third and fourth layers 4C, 4D in order to increase the structural integrity of the composite component 2. The RSW 20 may also encompass a portion of at least one of the first or second pieces 16, 18, a portion of at least one of the bonds 8A, 8B, and/or a portion of at least one of the reinforcements 6A, 6B, but this is not required.

Figure 4:
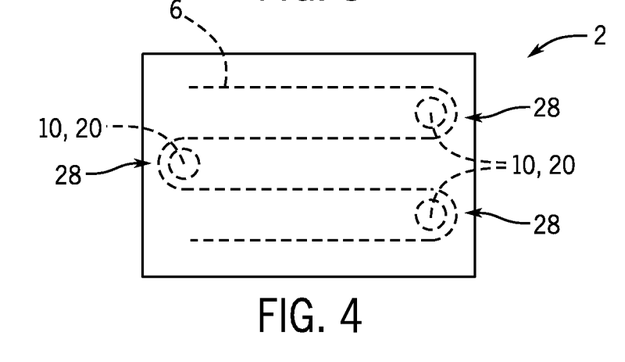
FIG. 4 is a schematic top view of a composite component in accordance with the present subject matter.

FIG. 4 depicts a composite component 2, including the reinforcement 6 embedded between two layers 4A, 4B (not shown) of the base component 4. The reinforcement 6 is bonded to the base component 4 (i.e. between the two layers 4A, 4B) by a bond 8 formed by a UAM process. The reinforcement 6 is arranged in serpentine configuration including turns 28. The UAM process may also form a UAM coupling between the two layers 4A, 4B at the interface 12. One or more localized couplings 10, e.g. three RSWs 20 as shown, may be formed between the two layers 4A, 4B to strengthen the UAM coupling between the two layers 4A, 4B. The localized couplings 10 are arranged at an inside radius of each turn 28 of the reinforcement 6. The serpentine path of the reinforcement 6 may be used to increase the surface area in common between the reinforcement 6 and the base component 4, and therefore may increase the interfacial force required to cause relative movement between the reinforcement 6 and the base component 4. However in this configuration, the reinforcement 6, such as at the turn 28, may not be oriented parallel to an expected applied load to be applied to the composite component 2, and thus the applied load may cause the reinforcement 6 to start a delamination of the first layer 4A from the second layer 4B at the interface 12, thus causing failure of the composite component 2. By post-processing to create the localized couplings 10 at discrete regions at the inside radius of each turn 28, the UAM formed bond 8 between the reinforcement 6 and the two layers 4A, 4B can be indirectly reinforced. This may be accomplished by the localized couplings 10 inhibiting delamination of the two layers 4A, 4B, thus inhibiting movement of the reinforcement 6 relative to the two layers 4A, 4B and destruction of the bond 8 between the reinforcement 6 and the two layers 4A, 4B. In this way, the localized couplings 10 indirectly reinforce the bond 8 and enable the bond 8 to withstand the pressure created by the tension at the turn 28 of the reinforcement 6.

As shown in FIG. 4, the localized coupling 10 does not encompass the reinforcement 6, but instead is spaced therefrom, and thus provides indirect reinforcement of the bond 8 because it does not strengthen the bond 8 itself but supports the bond 8. Instead, the localized coupling 10 is formed between the two layers 4A, 4B to connect them securely at their interface, and thus supports the bond 8. This may be done where the reinforcement 6 does not include metallic content, or if it is otherwise undesirable to have the localized coupling 10 encompass the reinforcement 6, such as if the reinforcement is temperature sensitive and degrades when exposed to elevated temperatures. In this way, the localized coupling 10 indirectly reinforces the bond 8 between the reinforcement 6 and the base component 4 by strengthening the UAM bond between the two layers 4A, 4B, and without the localized coupling 10 encompassing the reinforcement 6. Alternately, the localized couplings 10 may encompass a portion of the reinforcement at each turn 28, or may contact (be tangent to) the reinforcement at each turn 28. This may be done where the reinforcement 6 includes a metallic content, or where it is otherwise desirable to do so.

FIGS. 5-9 depict the localized coupling 10 being used to form the bond 8 itself. As shown, the reinforcement 6 is bonded to a surface of a base component 4, rather than between two layers 4A, 4B of a base component 4, and thus the reinforcement 6 is not surrounded by the base component 4. The base component 4 is depicted to consist of a single piece of material. However, this configuration is not required, and the base component 4 can include multiple layers.

In FIGS. 5-9, the reinforcement 6 is bonded to the base component 4 without utilizing a UAM process. Instead, the localized coupling 10, such as a RSW 20, forms the bond 8 between the reinforcement 6 and the base component 4 and thereby anchors the reinforcement 6 to the base component 4. As such, the localized coupling 10 does not directly or indirectly reinforce the bond 8, but instead forms the bond 8. Such formation of the bond 8 by the formation of the localized coupling 10 (in the form of a RSW 20) may be used where the reinforcement 6 includes a metal material that itself can be fusion welded with the metal base component 4. The metal material of the reinforcement 6 may have the same or different composition from the base component 4. Alternatively, the reinforcement 6 may include ceramic matrix composites or reinforced polymers.

Figure 5:
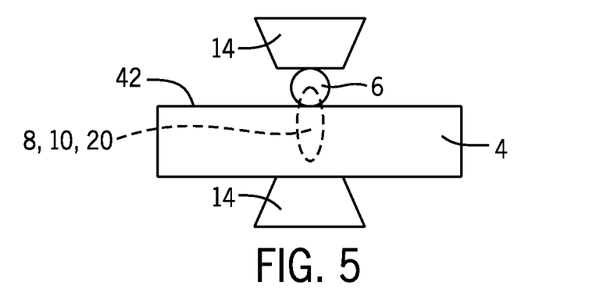
FIG. 5 is a schematic cross-sectional view of a composite component in accordance with the present subject matter.
Figure 6:
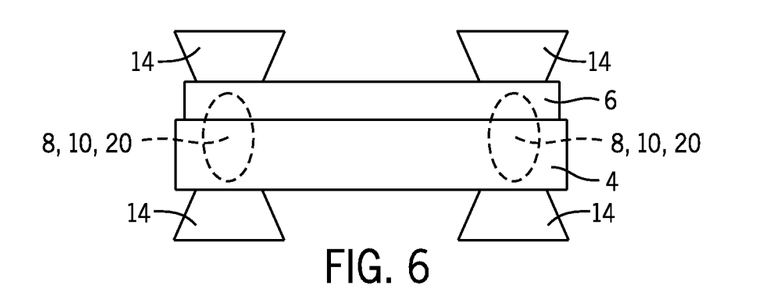
FIG. 6 is a schematic side view of a composite component in accordance with the present subject matter.

As depicted in FIGS. 5-6, the reinforcement 6 is arranged on an exposed surface 42 of the base component 4, and the RSW tips 14 are used to weld the reinforcement 6 to the base component 4 by forming the RSW 20 to encompass a portion of the reinforcement 6 and a portion of the base component 4. The RSWs 20 are only formed at discrete locations along the length of the reinforcement 6, and therefore encompass only a portion of the reinforcement 6 at those locations. The RSWs 20 thus form the bonds 8 between the reinforcement 6 and the base component 4.

Figure 7:
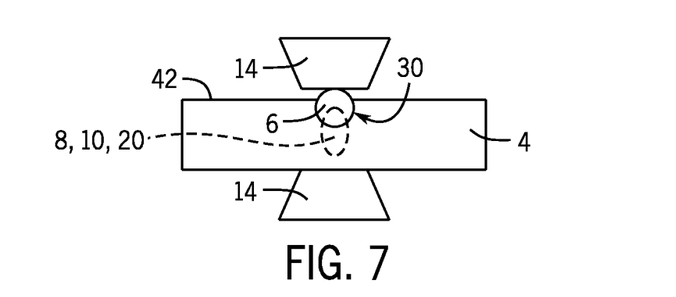
FIG. 7 is a schematic cross-sectional view of a composite component in accordance with the present subject matter.

FIG. 7 shows the reinforcement 6 being arranged in a pre-formed channel 30 of the base component 4, which channel 30 is made prior to forming the RSW 20. The channel 30 may be formed by machining the base component 4, molding the base component 4, or by other forming operations. The channel 30 may allow the reinforcement 6 to be embedded in the base component 4 without the need for using UAM, and/or may simplify the process of welding these objects together by holding the reinforcement 6 in a stable pre-defined position relative to the base component 4.

Figure 8:
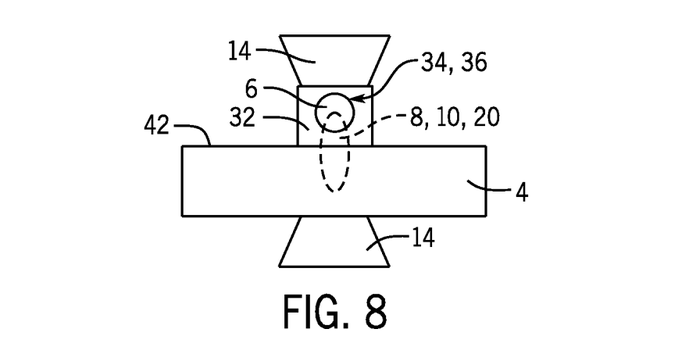
FIG. 8 is a schematic cross-sectional view of a composite component in accordance with the present subject matter.
Figure 9:
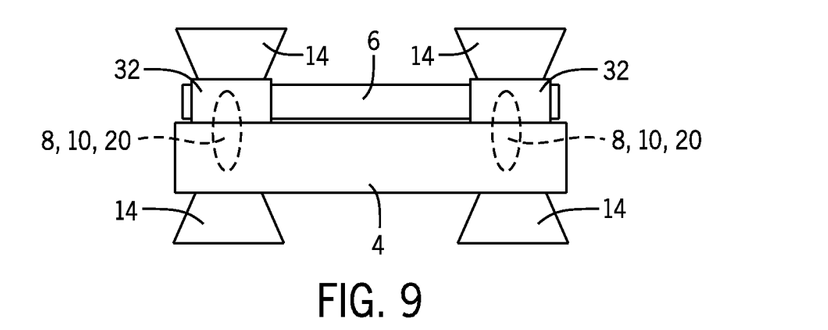
FIG. 9 is a schematic side view of a composite component of FIG. 8.

FIGS. 8-9 depict the reinforcement 6 being configured with collars 32 arranged at discrete locations along the reinforcement 6. The collars 32 are arranged around or over the reinforcement 6. The collars 32 are arranged on the exposed surface 42 of the base component 4. RSW tips 14 are used to create RSWs 20 to bond the collars 32 to the base component 4, and the reinforcement 6 to the collars 32. The RSWs 20 encompass a portion of the collars 32 and a portion of the reinforcement 6, and thus form the bond 8 between the reinforcement 6 and the base component 4, via collars 32.

Figure 10:
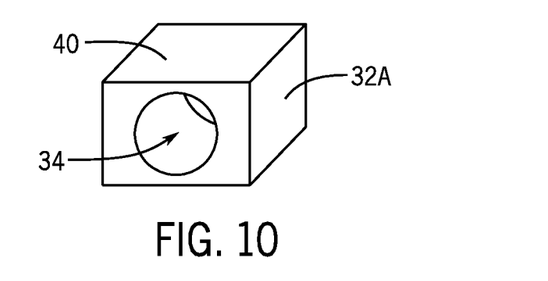
FIG. 10 is a perspective view of a collar in accordance with the present subject matter.

FIG. 10 depicts a collar 32A in the shape of a block having a void in the form of a through hole 34 therein. The reinforcement 6 is inserted in the through hole 34 before resistance spot welding the collar 32A and reinforcement 6 to the base component 4. The through hole 34 may be sized and shaped so as to closely correspond to the outside surface of the reinforcement 6 to create a close fitting engagement between them.

Figure 11:
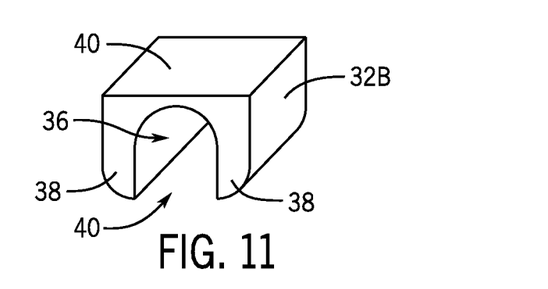
FIG. 11 is a perspective view of a collar in accordance with the present subject matter.
Figure 12:
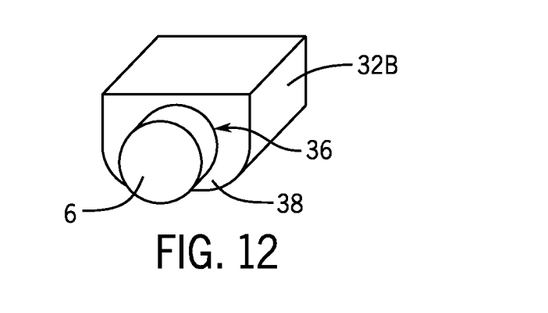
FIG. 12 is a perspective view of the collar of FIG. 11 arranged on a reinforcement.

FIGS. 11-12 depict a collar 32B having two legs 38 extending downward to define a void in the form of a trench 36 extending through the collar 32B. The reinforcement 6 is inserted in the trench 36 before resistance spot welding the collar 32B and reinforcement 6 to the base component 4. The trench 36 may be sized and shaped so as to closely correspond to the outside surface of the reinforcement 6 to create a close fitting engagement between them.

FIG. 12 depicts the reinforcement 6 arranged in the trench 36 and the trench 36 being in a state after it is welded to the base component 4, which is not shown. As depicted, the legs 38 of the collar 32B are deformed slightly from their original shape as shown in FIG. 11 due to resistance spot welding, and thus deflect inward towards each other and around a bottom of the reinforcement 6 to encompass the reinforcement 6 between them. Such deformation of the legs 38 may be a result of resistance spot welding the collar 32B to the base component 4, and may act to more securely anchor the reinforcement 6 in the collar 32B, and thus to the base component 4.

The collar 32 may have a flat top surface 40, which may allow the RSW tip 14 to more easily engage the collar and more efficiently transfer energy into the collar 32 for making the RSW 20.

A method of making a composite component 2 includes providing a base component 4 and a reinforcement 6. A bond 8 is formed between the base component 4 and the reinforcement 6. The bond 8 is reinforced with, or formed by, a localized coupling 10 arranged only at a discrete location on the base component 4. The localized coupling 10 includes a compression 22 of the base component 4, a weld 20 in the base component 4, or a heat affected zone of the weld 20.

The base component 4 may include a first metal material, and the reinforcement 6 may include a second metal material having a composition different from the first metal material. The bond 8 may be formed by ultrasonic welding the reinforcement 6 to the base component 4. The localized coupling 10 may include a resistance spot weld 20 encompassing a portion of the bond 8.

The base component 4 may include a first metal material, the reinforcement 6 may be a single continuous fiber, and the method may further include resistance spot welding the base component 4 to thereby form a resistance spot weld 20 with a heat affected zone 24. The localized coupling 10, may then include either a) the resistance spot weld 20 encompassing the reinforcement 6 (FIGS. 1-2), b) the heat affected zone 24 encompassing the reinforcement 6 (FIG. 3), or c) the resistance spot weld 20 arranged at an inside radius of a turn 28 of the reinforcement 6 (FIG. 4).

The base component 4 may include two layers 4A, 4B of metal material (FIG. 1-2). The two layers 4A, 4B of metal material may have different compositions. The method may further include ultrasonic welding the two layers 4A, 4B together with the reinforcement 6A arranged between the two layers 4A, 4B, such that the reinforcement 6A is embedded in the two layers 4A, 4B.

The two layers 4A, 4B and the reinforcement 6A may define a first piece 16 (FIG. 3). The method may further comprise forming a second piece 18 including by ultrasonic welding two more layers 4C, 4D of metal material together with a second reinforcement 6B, e.g. a single continuous fiber, arranged between the two more layers 4C, 4B, such that the second reinforcement 6B is embedded in the two more layers 4C, 4D. The resistance spot weld 20 bonds the first piece 16 to the second piece 18. The first and second pieces 16, 18 can also be bonded by a UAM weld. The heat affected zone 24 from the RSW 20 encompasses the first reinforcement 6A of the first piece 16, the second reinforcement 6B of the second piece 18, at least a portion of the first ultrasonic weld 8A of the first piece 16 at the first interface 12A of the first piece 16, and at least a portion of a second ultrasonic weld 8B at the second interface 12B of the second piece 18. The two reinforcements 6A, 6B do not need to be aligned parallel as shown in FIG. 3, and can be arranged in different configurations. Further, even if both pieces 16, 18 have reinforcements 6A, 6B, which is not required, the RSW 20 does not need to encompass both reinforcements 6A, 6B. Also, it may be that the second piece 18 is a metal part without a reinforcement 6B.

The reinforcement 6 may be arranged to include a turn 28 having the inside radius, and the resistance spot weld 20 may be arranged at the inside radius of the turn 28 of the reinforcement 6.

The reinforcement 6 may include a second metal material; the resistance spot weld 20 may encompasses the reinforcement 6; and the reinforcement 6 may be embedded in the base component 4.

The reinforcement 6 may be arranged in a channel 30 in the base component 4 before the resistance spot welding, or the reinforcement 6 may be pressed into the base component 4 during resistance spot welding.

The composite component 2 may further include a collar 32. The method may further include arranging the reinforcement 6 in a void (i.e. through hole 34 or trench 36) of the collar 32 before the resistance spot welding. The resistance spot welding welds the collar 32 to the base component 4 and bonds the reinforcement 6 to the collar 32.

The void may be a trench 36 extending through the collar 32B. The collar 32B includes two legs 38 defining the trench 36. The reinforcement 6 is arranged in the trench 36 such that the two legs 38 are arranged on either side of the reinforcement 6. Resistance spot welding deforms the two legs 38 to deflect inward to encompass the reinforcement 6.

The method may further include forming contours in the base component 4 after the bond 8 is formed and before resistance spot welding.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method of making a composite component, comprising:
providing a base component and a reinforcement, a material of the reinforcement being stronger, stiffer, having greater energy absorption, or having increased fatigue life than the base component; and
forming a localized coupling in the base component to either a reinforce a bond between the base component and the reinforcement, or b) form the bond between the base component and the reinforcement,
wherein if the localized coupling forms the bond, then the reinforcement is a continuous fiber, a tow of fibers, a thread of fibers, a veil of fibers, a non-woven mat of fibers, a metal wire, or a metal cable;
wherein the localized coupling is arranged only at a discrete location on the base component; and
wherein the localized coupling includes a compression of the base component, a fusion weld in the base component, or a heat affected zone of the weld.
2. The method according to claim 1, wherein:
the localized coupling reinforces the bond;
the base component includes a first metal material;
the reinforcement includes a second metal material having a composition different from or the same as the first metal material;
the bond is formed by ultrasonic welding the reinforcement to the base component; and
the localized coupling includes a resistance spot weld encompassing a portion of the bond.
3. The method according to claim 1, wherein:
the base component includes a first metal material;
the method further includes resistance spot welding the base component to thereby form a resistance spot weld with the heat affected zone; and
either a) the localized coupling includes the resistance spot weld encompassing a portion of the reinforcement, or the heat affected zone encompassing a portion of the reinforcement, or b) the reinforcement is arranged to include a turn having an inside radius and the localized coupling includes the resistance spot weld arranged at the inside radius of the turn of the reinforcement.
4. The method according to claim 3, wherein:
the base component includes two layers of metal material;
the two layers of metal material have the same or different compositions; and
the method further includes bonding the two layers together with the reinforcement arranged between the two layers, such that the reinforcement is embedded in the two layers.
5. The method according to claim 4, wherein:
the two layers and the reinforcement define a first piece;
the method further comprises forming a second piece including by bonding two more layers of metal material together with a second reinforcement arranged between the two more layers, such that the second reinforcement is embedded in the two more layers;
the resistance spot weld bonds the first piece to the second piece; and
the heat affected zone encompasses a portion of the reinforcement of the first piece, and/or a portion of the second reinforcement of the second piece.
6. The method according to claim 3, wherein:
the reinforcement includes a second metal material;
the resistance spot weld encompasses the reinforcement; and
the reinforcement is embedded in the base component.
7. The method according to claim 6, wherein:
the reinforcement is arranged in a channel in the base component before the resistance spot welding, or the reinforcement is pressed into the base component during resistance spot welding.

8. The method according to claim 3, wherein:

the composite component further includes a collar;

the method further includes arranging the reinforcement in a void of the collar before the resistance spot welding;

the resistance spot welding connects the collar to the base component and connects the reinforcement to the collar.

9. The method according to claim 8, wherein:

the void is a trench extending through the collar, the collar includes two legs defining the trench;

the reinforcement is arranged in the trench such that the two legs are arranged on either side of the reinforcement; and resistance spot welding deforms the two legs to deflect inward to encompass the reinforcement.

10. The method according to claim 3, further including forming contours in the base component after the bond is formed and before resistance spot welding.

11. A method of making a composite component, comprising:

providing a base component and a reinforcement, a material of the reinforcement being stronger, stiffer, having greater energy absorption, or having increased fatigue life than the base component;

forming a bond between the base component and the reinforcement by ultrasonic welding the reinforcement to the base component; and forming a localized coupling only at a discrete location on the base component to reinforce the bond between the base component and the reinforcement;

wherein the localized coupling includes a compression of the base component, a fusion weld in the base component, or a heat affected zone of the weld.

12. A method of making a composite component, comprising:

providing a base component and a reinforcement, a material of the reinforcement being stronger, stiffer, having greater energy absorption, or having increased fatigue life than the base component; and forming a localized coupling in the base component to either a) reinforce a bond between the base component and the reinforcement, or b) form the bond between the base component and the reinforcement;

wherein the localized coupling is arranged only at a discrete location on the base component;

wherein the method further includes resistance spot welding the base component to thereby form a resistance spot weld with a heat affected zone;

wherein either a) the localized coupling includes the resistance spot weld encompassing a portion of the reinforcement, or the heat affected zone encompassing a portion of the reinforcement, or b) the reinforcement is arranged to include a turn having an inside radius and the localized coupling includes the resistance spot weld arranged at the inside radius of the turn of the reinforcement;

wherein the base component includes two layers of metal material;

wherein the two layers of metal material have the same or different compositions; and wherein the method further includes bonding the two layers together with the reinforcement arranged between the two layers, such that the reinforcement is embedded in the two layers.

* * * * *